United States Patent
Itoi

(10) Patent No.: US 10,072,128 B2
(45) Date of Patent: Sep. 11, 2018

(54) POLYOLEFIN-BASED RESIN PRE-EXPANDED PARTICLES AND POLYOLEFIN-BASED RESIN IN-MOLD EXPANSION MOLDED ARTICLE COMPRISING POLYOLEFIN-BASED RESIN PRE- EXPANDED PARTICLES

(71) Applicant: KANEKA CORPORATION, Osaka-shi, Osaka (JP)

(72) Inventor: Akihiro Itoi, Osaka (JP)

(73) Assignee: KANEKA CORPORATION, Osaka-shi (JP)

( * ) Notice: Subject to any disclaimer, the term of this patent is extended or adjusted under 35 U.S.C. 154(b) by 276 days.

(21) Appl. No.: 14/608,492

(22) Filed: Jan. 29, 2015

(65) Prior Publication Data
US 2015/0210815 A1    Jul. 30, 2015

Related U.S. Application Data

(62) Division of application No. 13/264,041, filed as application No. PCT/JP2010/002681 on Apr. 14, 2010.

(30) Foreign Application Priority Data

Apr. 15, 2009  (JP) ................. 2009-099196

(51) Int. Cl.
| | |
|---|---|
| C08J 9/16 | (2006.01) |
| C08J 9/00 | (2006.01) |
| C08J 9/12 | (2006.01) |
| C08J 9/14 | (2006.01) |
| C08J 9/18 | (2006.01) |
| C08K 5/3492 | (2006.01) |
| C08K 5/523 | (2006.01) |

(52) U.S. Cl.
CPC .......... *C08J 9/0038* (2013.01); *C08J 9/0028* (2013.01); *C08J 9/122* (2013.01); *C08J 9/141* (2013.01); *C08J 9/18* (2013.01); *C08K 5/34926* (2013.01); *C08K 5/523* (2013.01); *C08J 2203/14* (2013.01); *C08J 2323/02* (2013.01)

(58) Field of Classification Search
None
See application file for complete search history.

(56) References Cited

U.S. PATENT DOCUMENTS

| | | | |
|---|---|---|---|
| 6,117,995 | A | 9/2000 | Zedda et al. |
| 2002/0015847 | A1 | 2/2002 | Shimizu et al. |
| 2003/0105194 | A1 | 6/2003 | Stuart et al. |
| 2003/0138626 | A1 | 7/2003 | Shimizu et al. |
| 2004/0138351 | A1 | 7/2004 | Kaprinidis et al. |
| 2004/0171708 | A1 | 9/2004 | Yoshizawa et al. |

FOREIGN PATENT DOCUMENTS

| | | |
|---|---|---|
| CN | 1599771 A | 3/2005 |
| EP | 1452559 A1 | 9/2004 |
| EP | 1454947 A1 | 9/2004 |
| EP | 1462481 A2 | 9/2004 |
| JP | 9-227711 A | 9/1997 |
| JP | 2001-348724 A | 12/2001 |
| JP | 2002-507238 A | 3/2002 |
| JP | 2003-251770 A | 9/2003 |
| JP | 2004-263033 A | 9/2004 |
| JP | 2006-316168 A | 11/2006 |
| JP | 2007-056150 A | 3/2007 |
| JP | 2009-298892 A | 12/2009 |
| WO | 03/048239 A1 | 6/2003 |

OTHER PUBLICATIONS

International Search Report PCT/JP2010/002681, dated May 25, 2010.
Notification of Transmittal of Translation of the International Preliminary Report on Patentability (Form PCT/IB/338) of International Application No. PCT/JP2010/002681 with Forms PCT/IB/373 and PCT/ISA/237.
Chinese Office Action dated Sep. 12, 2012, issued in corresponding Chinese Patent Application No. 201080016194.4 (4 pages).
Extended European Search Report dated Aug. 26, 2013, issued in corresponding European Patent Application No. 10764257.1.

*Primary Examiner* — Kara Brady Boyle
(74) *Attorney, Agent, or Firm* — Westerman, Hattori, Daniels & Adrian, LLP

(57) ABSTRACT

Polyolefin-based resin pre-expanded particles include a polyolefin-based resin composition including a polyolefin-based resin, a sterically hindered amine ether flame retardant expressed by the general formula (1): $R^1NHCH_2CH_2CH_2NR^2CH_2CH_2NR^3CH_2CH_2CH_2NHR^4$ (1), and a phosphoric ester. The polyolefin-based resin pre-expanded particles are flame retardant polyolefin-based resin pre-expanded particles that can have good in-mold expansion moldability and exhibit excellent flame resistance compared to the conventional pre-expanded particles even when molded into a sample having a higher density or a larger thickness without using a halogen flame retardant, and that do not generate harmful gas during burning.

5 Claims, 1 Drawing Sheet

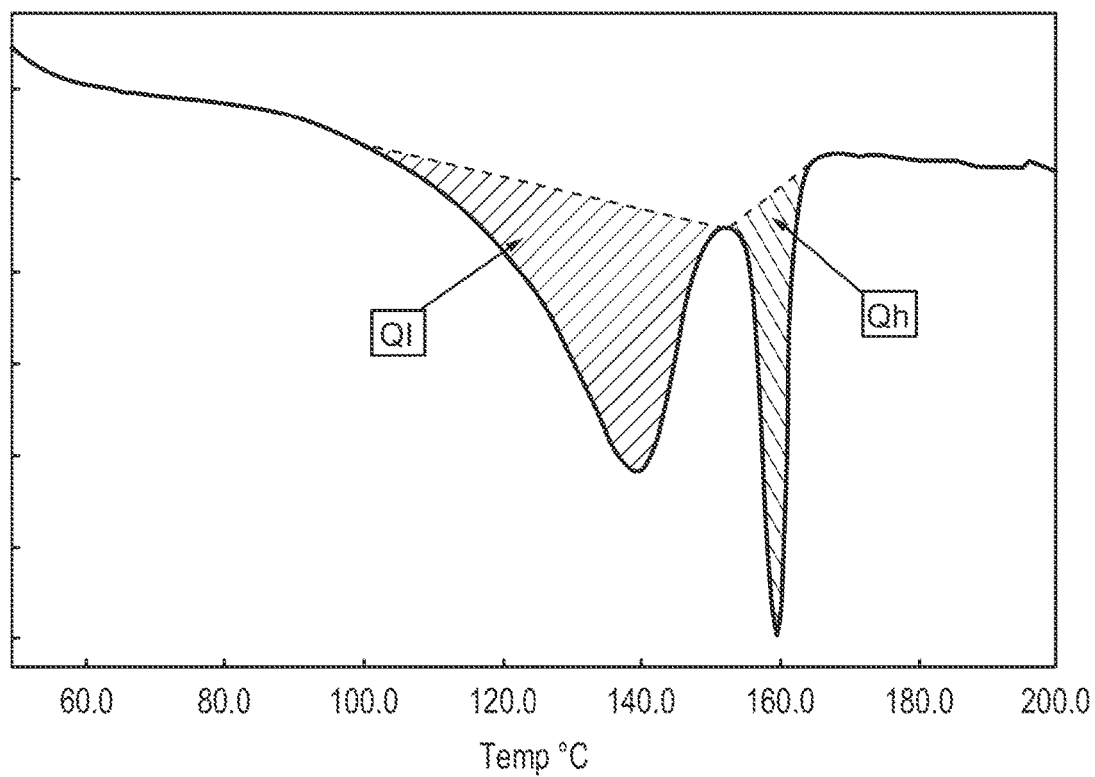

POLYOLEFIN-BASED RESIN PRE-EXPANDED PARTICLES AND POLYOLEFIN-BASED RESIN IN-MOLD EXPANSION MOLDED ARTICLE COMPRISING POLYOLEFIN-BASED RESIN PRE- EXPANDED PARTICLES

CROSS-REFERENCE TO RELATED APPLICATIONS

This is a divisional application of U.S. patent application Ser. No. 13/264,041 filed on Oct. 12, 2011, which is a 371 of International Application No. PCT/JP2010/002681, filed on Apr. 14, 2010, which claims the benefit of priority from the prior Japanese Patent Application No. 2009-099196, filed on Apr. 15, 2009, the entire contents of which are incorporated herein by reference.

TECHNICAL FIELD

The present invention relates to polyolefin-based resin pre-expanded particles that have flame resistance and are used for the production of a heat insulating material, a cushioning packaging material, a returnable container, an automotive bumper core, electrical and electronic products/components, or the like, and particularly the production of the electrical and electronic products/components. The present invention also relates to a polyolefin-based resin in-mold expansion molded article produced by in-mold expansion molding of the polyolefin-based resin pre-expanded particles.

BACKGROUND ART

An in-mold expansion molded article is characterized by arbitrary shape, lightweight, heat insulating properties, etc. In particular, an in-mold expansion molded article obtained from polyolefin-based resin pre-expanded particles is superior to an in-mold expansion molded article obtained from polystyrene-based resin pre-expanded particles in chemical resistance, heat resistance, and a distortion restoration rate after compression. Because of these characteristics, the in-mold expansion molded article obtained from the polyolefin-based resin pre-expanded particles has been put to various uses such as an automotive interior material, an automotive bumper core, a heat insulating material, and a cushioning packaging material.

However, the expansion molded article made of a polyolefin-based resin generally has the disadvantage of being flammable, although it has the excellent properties as described above. In particular, the expansion molded article has high flammability and burns easily compared to a non-expansion molded article.

In recent years, there is a growing demand for automotive parts, building materials, and electrical and electronic products/components having flame resistance and self-extinguishing properties. To meet the demand, many studies have been conducted on the expansion molded articles with flame resistance.

Various methods for imparting flame resistance to the inherently flammable polyolefin-based resin are being studied, and a flame retardant is added in general. Various flame retardants such as a halogen-containing compound, a hydrated metal oxide, phosphoric esters, and a nitrogen-containing compound have been used for the polyolefin-based resin.

Patent Document 1 discloses adding a sterically hindered amine ether flame retardant (a non-halogen flame retardant) to polyolefin-based resin pre-expanded particles, thereby providing an in-mold expansion molded article that meets HF-1 according to the UL94 horizontal burning test for foamed materials without causing a problem such as the deterioration of the in-mold expansion moldability, as shown in Examples. Patent Document 2 discloses an in-mold expansion molded article that uses the same flame retardant as that disclosed in Patent Document 1 and shows self-extinguishing properties in the burning test based on FVVSS302. In general, the polyolefin-based resin in-mold expansion molded article having a higher density or a larger thickness burns more easily. Therefore, even with the use of the sterically hindered amine ether flame retardant, it is desired that the flame retardant performance be further improved.

Patent Document 3 discloses a flame retardant polypropylene fiber and a flame retardant polypropylene film that include 0.5 wt % or more of a phosphoric ester-based flame retardant and 0.4 wt % or more of an NOR type hindered amine-based stabilizer. Patent Document 4 discloses a flame retardant that includes a metal hydroxide, a hindered amine compound having a piperidine skeleton, and a phosphoric ester. However, the production processes of the polyolefin-based resin pre-expanded particles and the in-mold expansion molded article thereof involve, e.g., the impregnation of the resin particles with a blowing agent, heating, rapid pressure release, and heating with steam. Therefore, there is concern that decomposition of the flame retardant or a reaction due to the addition of the flame retardant may occur. Moreover, the polyolefin-based resin pre-expanded particles are filled into a mold, heated with steam or the like, and fused together to form an in-mold expansion molded article. In this case, if the moldability is deteriorated due to the properties of the pre-expanded particles, a commercial value of the molded article is significantly reduced. The additives mixed with the polyolefin-based resin can affect, e.g., the shape and size of cells, the interconnection between the cells, and the fusion of the pre-expanded particles, and thus such changes may result in the deterioration of the in-mold expansion moldability and the mechanical strength.

Patent Document 5 discloses flame retardant polyolefin-based resin pre-expanded particles that include a pentavalent phosphate compound containing halogen. However, the use of halogen-containing materials has been restricted in recent years. Moreover, a halogenated phosphoric ester differs from a non-halogenated phosphoric ester in degradability, compatibility with the resin, or the like. Further, Patent Document 5 discloses the addition of a flame retardant aid, but does not disclose the addition of the other flame retardants.

PRIOR ART DOCUMENTS

Patent Documents

Patent Document 1: WO 2003/048239
Patent Document 2: JP 2004-263033 A
Patent Document 3: JP 2001-348724 A
Patent Document 4: JP 2006-316168 A
Patent Document 5: JP H9(1997)-227711 A

DISCLOSURE OF INVENTION

Problem to be Solved by the Invention

It is an object of the present invention to provide flame retardant polyolefin-based resin pre-expanded particles that can have good in-mold expansion moldability and exhibit excellent flame resistance compared to the conventional pre-expanded particles even when molded into a sample having a higher density or a larger thickness without using a halogen flame retardant, and that do not generate harmful gas during burning.

Means for Solving Problem

As a result of a detailed study conducted in view of the above problems, the present inventors found out that when the polyolefin-based resin pre-expanded particles are formed of a polyolefin-based resin composition including a sterically hindered amine ether flame retardant and a phosphoric ester, the polyolefin-based resin pre-expanded particles can have good in-mold expansion moldability and exhibit excellent flame resistance compared to the conventional pre-expanded particles, specifically excellent flame resistance even in the case of an in-mold expansion molded article having a higher density or a larger thickness.

The present invention has the following configuration.

[1] Polyolefin-based resin pre-expanded particles including a polyolefin-based resin composition including:
a polyolefin-based resin;
a sterically hindered amine ether flame retardant expressed by the following general formula (1):

$R^1NHCH_2CH_2CH_2NR^2CH_2CH_2NR^3CH_2CH_2CH_2NHR^4$ (1)

(where $R^1$, $R^2$ and one of $R^3$ and $R^4$ are an s-triazine moiety T expressed by the following general formula (2):

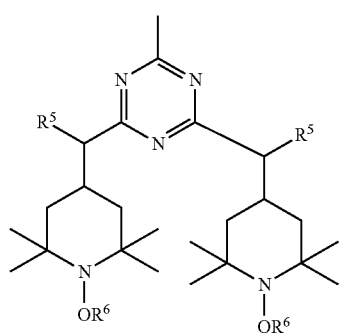

(2)

the other of $R^3$ and $R^4$ is a hydrogen atom, and in the general formula (2), $R^5$ is an alkyl group having 1 to 12 carbon atoms and $R^6$ is a methyl group, a cyclohexyl group, or an octyl group); and
a phosphoric ester.

[2] The polyolefin-based resin pre-expanded particles according to [1], obtained by dispersing polyolefin-based resin particles composed of the polyolefin-based resin composition into an aqueous dispersion medium in the presence of a blowing agent, heating the dispersion thus obtained under pressure, and releasing the dispersion into a low pressure region.

[3] The polyolefin-based resin pre-expanded particles according to [1] or [2], wherein the phosphoric ester is an aromatic-based phosphoric ester.

[4] The polyolefin-based resin pre-expanded particles according to any one of [1] to [3], wherein the blowing agent is at least one selected from the group consisting of isobutane and normal butane.

[5] The polyolefin-based resin pre-expanded particles according to any one of [1] to [4], wherein the blowing agent is carbon dioxide.

[6] The polyolefin-based resin pre-expanded particles according to any one of [1] to [5], wherein the polyolefin-based resin composition includes 0.01 parts by weight to 20 parts by weight of the sterically hindered amine ether flame retardant expressed by the general formula (1) and 0.01 parts by weight to 10 parts by weight of the phosphoric ester with respect to 100 parts by weight of the polyolefin-based resin.

[7] The polyolefin-based resin pre-expanded particles according to any one of [1] to [6], wherein the polyolefin-based resin is a polypropylene-based resin.

[8]A polyolefin-based resin in-mold expansion molded article produced by in-mold expansion molding of the polyolefin-based resin pre-expanded particles according to any one of [1] to [7].

Effects of the Invention

The use of the polyolefin-based resin pre-expanded particles of the present invention can provide an in-mold expansion molded article that has excellent flame resistance compared to the conventional expansion molded article even in the case of a sample having a higher density or a larger thickness while maintaining good in-mold expansion moldability and surface appearance that are comparable to those of the conventional expansion molded article.

BRIEF DESCRIPTION OF DRAWINGS

FIG. 1 shows an example of a DSC curve obtained when the temperature of the polyolefin-based resin pre-expanded particles of the present invention is increased from 40° C. to 220° C. at a rate of 10° C./min using a differential scanning calorimeter (DSC). In FIG. 1, the DSC curve has a melting peak on the low temperature side and a melting peak on the high temperature side; Ql represents a heat quantity of the melting peak on the low temperature side, i.e., a heat quantity indicated by an area enclosed by the melting peak on the low temperature side and a tangent line that extends from the maximum point between the low-temperature peak and the high-temperature peak to the base line indicating the start of melting; and Qh represents a heat quantity of the melting peak on the high temperature side, i.e., a heat quantity indicated by an area enclosed by the melting peak on the high temperature side and a tangent line that extends from the maximum point between the low-temperature peak and the high-temperature peak to the base line indicating the end of melting.

DESCRIPTION OF THE INVENTION

The polyolefin-based resin used in the present invention is a polymer containing 75 wt % or more of an olefin-based monomer. The content of the olefin-based monomer is preferably 80 wt % or more. The polyolefin-based resin may contain 25 wt % or less, preferably 20 wt % or less of other monomers copolymerizable with the olefin-based monomer.

Specific examples of the olefin-based monomer include α-olefins having 2 to 12 carbon atoms such as ethylene, propylene, butene-1, isobutene, pentene-1,3-methyl-butene-1, hexene-1,4-methyl-pentene-1,3,4-dimethyl-butene-1, heptene-1,3-methyl-hexene-1, octene-1, and decene-1. They may be used individually or in combination of two or more.

Specific examples of the other monomers copolymerizable with the olefin-based monomer include cyclic olefins such as cyclopentene, norbornene, and 1,4,5,8-dimethano-1,2,3,4,4a,8,8a,6-octahydronaphthalene, and dienes such as 5-methylene-2-norbornene, 5-ethylidene-2-norbornene, 1,4-hexadiene, methyl-1,4-hexadiene, and 7-methyl-1,6-octadiene. They may be used individually or in combination of two or more.

Specific examples of the polyolefin-based resin used in the present invention include polyethylene-based resins containing ethylene as the main component such as high density polyethylene, medium density polyethylene, low density polyethylene, and linear low density polyethylene, and polypropylene-based resins containing propylene as the main component. These polyolefin-based resins may be used individually or in combination of two or more. In particular, the use of the polypropylene-based resin as the polyolefin-based resin is preferred in terms of the mechanical strength, the heat resistance, or the like.

The polypropylene-based resin is not particularly limited as long as it contains propylene as the main component of the monomer. For example, the polypropylene-based resin can be a propylene homopolymer, an α-olefin-propylene random copolymer, or an α-olefin-propylene block copolymer. They may be used individually or in combination of two or more. In particular, the polypropylene-based resin containing ethylene that is copolymerized with propylene as a monomer component (i.e., the α-olefin is ethylene) is preferred because it is easily available and has excellent processing moldability. The content of ethylene in the polypropylene-based resin is preferably 1 wt % to 10 wt %, more preferably 2 wt % to 7 wt %, even more preferably 3.5 wt % to 6 wt %, and particularly preferably 3.5 wt % to 5 wt %. The content of ethylene that is copolymerized with propylene in the polypropylene-based resin can be measured with $^{13}$C-NMR.

The melting point of the polypropylene-based resin used in the present invention is preferably 130° C. to 165° C., and more preferably 135° C. to 155° C. If the melting point of the polypropylene-based resin is less than 130° C., the heat resistance and the mechanical strength are not likely to be sufficient. If the melting point of the polypropylene-based resin is more than 165° C., it is difficult to ensure the fusion of beads in in-mold expansion molding. The melting point is determined in the following manner. Using a differential scanning calorimeter, the temperature of 1 to 10 mg of the polypropylene-based resin is increased from 40° C. to 220° C. at a rate of 10° C./min, then reduced to 40° C. at a rate of 10° C./min, and again raised to 220° C. at a rate of 10° C./min, so that a DSC curve is obtained. The melting point is a peak temperature of the endothermic peak on the DSC curve that is obtained when the temperature of the polypropylene-based resin is again raised to 220° C.

The melt flow rate (referred to as "MFR value" in the following) of the polypropylene-based resin used in the present invention is preferably 0.5 g/10 min to 30 g/10 min, and more preferably 2 g/10 min to 20 g/10 min. If the MFR value is less than 0.5 g/10 min, it may be difficult to provide polypropylene-based resin pre-expanded particles with a high expansion ratio. If the MFR value is more than 30 g/10 min, the cells of the polypropylene-based resin pre-expanded particles are easily broken, so that the open-cell ratio of the polypropylene-based resin pre-expanded particles is likely to be high. The MFR value of the polypropylene-based resin conforms to JIS K7210 and is measured at 230° C. and a load of 2.16 kg.

The ratio (Mw/Mn) of the weight average molecular weight (also referred to as "Mw" in the following) to the number average molecular weight (also referred to as "Mn" in the following) of the polypropylene-based resin used in the present invention is not particularly limited, but is preferably 3.0 or more, and particularly preferably 3.0 to 6.0.

The Mn and Mw of the polypropylene-based resin are measured under the following conditions.

Measuring device: Alliance GPC 2000-type gel permeation chromatography (GPC) manufactured by Waters Corporation Column: TSKgel GMH6-HT (2 columns) and TSKgel GMH6-HTL (2 columns), each column having an inner diameter of 7.5 mm×a length of 300 mm, manufactured by TOSOH CORPORATION Mobile phase: o-dichlorobenzene (containing 0.025% BHT)

Column temperature: 140° C.

Flow rate: 1.0 mL/min

Sample concentration: 0.15% (W/V)—o-dichlorobenzene

Injection amount: 500 μL

Molecular weight calibration: polystyrene (i.e., calibration using polystyrene standards)

Examples of the polyethylene-based resin used in the present invention include an ethylene homopolymer, an ethylene-α-olefin random copolymer, an ethylene-α-olefin block copolymer, low density polyethylene, high density polyethylene, and linear low density polyethylene. In this case, the a-olefins can be those having 3 to 15 carbon atoms, and they may be used individually or in combination of two or more. Among the polyethylene-based resins, the ethylene-α-olefin block copolymer containing a comonomer (other than ethylene) in an amount of 1 to 10 wt % or the linear low density polyethylene is preferred because they have good expandability.

The melting point of the polyethylene-based resin used in the present invention is preferably 110° C. to 140° C., and more preferably 120° C. to 130° C. By controlling the melting point in the above range, the pre-expanded particles can have good expandability and moldability, and thus the polyolefin-based resin in-mold expansion molded article obtained from the pre-expanded particles can have excellent mechanical strength and heat resistance. The melting point is determined in the following manner. Using a differential scanning calorimeter, the temperature of 1 to 10 mg of the polyethylene-based resin is increased from 40° C. to 200° C. at a rate of 10° C./min, then reduced to 40° C. at a rate of 10° C./min, and again raised to 200° C. at a rate of 10° C./min, so that a DSC curve is obtained. The melting point is a peak temperature of the endothermic peak on the DSC curve that is obtained when the temperature of the polyethylene-based resin is again raised to 200° C.

The melt flow rate (referred to as "MFR value" in the following) of the polyethylene-based resin used in the present invention is preferably 0.5 g/10 min to 30 g/10 min, more preferably 1 g/10 min to 5 g/10 min, and most preferably 1.5 g/10 min to 2.5 g/10 min. If the MFR value is less than 0.5 g/10 min, it may be difficult to provide pre-expanded particles with a high expansion ratio, and the cells tend to be nonuniform. If the MFR value is more than 30 g/10 min, it may be easily expanded, but the cells may be easily broken, so that the open-cell ratio of the pre-expanded particles is likely to be high, and the cells tend to be nonuniform. The MFR value of the polyethylene-based resin conforms to JIS K7210 and is measured at 190° C. and a load of 2.16 kg.

If necessary, the polyolefin-based resin may be a mixture of two or more types of polyolefin-based resins, or may be used in combination with other thermoplastic resins such as polystyrene and ionomer to the extent that the properties of the polyolefin-based resin are not impaired.

The polyolefin-based resin used in the present invention can be obtained using catalysts such as a Ziegler catalyst, a metallocene catalyst, and a post-metallocene catalyst. The use of the Ziegler catalyst can provide a polymer having a large Mw/Mn ratio. Moreover, when the polymers obtained using these catalysts are oxidatively decomposed with an organic peroxide, the properties such as a molecular weight and a melt flow rate of the polymers can be adjusted.

Examples of the organic peroxide that may be used in the present invention include 1,1-bis(t-butylperoxy)-3,3,5-trimethylcyclohexane, t-butylperoxy laurate, 2,5-dimethyl-2,5-di(benzoylperoxy)hexane, t-butylperoxy benzoate, dicumyl peroxide, 1,3-bis(t-butylperoxyisopropyl)benzene, and t-butylperoxyisopropyl monocarbonate.

The amount of the organic peroxide to be used is preferably 0.001 parts by weight to 0.1 parts by weight per 100 parts by weight of the polyolefin-based resin. The oxidative decomposition of the polyolefin-based resin can be performed, e.g., by heating and melting the polyolefin-based resin to which the organic peroxide has been added in an extruder.

It is preferable that the polyolefin-based resin used in the present invention is not crosslinked. However, the polyolefin-based resin may be crosslinked by treatment with an organic peroxide or radiation.

The sterically hindered amine ether flame retardant used in the present invention is a compound expressed by the following general formula (1):

(where $R^1$, $R^2$ and one of $R^3$ and $R^4$ are an s-triazine moiety T expressed by the following general formula (2), the other of $R^3$ and $R^4$ is a hydrogen atom, and in the general formula (2), $R^5$ is alkyl groups having 1 to 12 carbon atoms such as methyl group, ethyl group, propyl group, butyl group, n-pentyl group, n-hexyl group, n-heptyl group, nonyl group, decyl group, undecyl group, dodecyl group, isopropyl group, isobutyl group, sec-butyl group, tert-butyl group, 2-ethylbutyl group, isopentyl group, 1-methylpentyl group, 1,3-dimethylbutyl group, 1-methylhexyl group, isoheptyl group, 1,1,3,3-tetramethylpentyl group, 1-methylundecyl group, and 1,1,3,3,5,5-hexamethylhexyl group, and $R^6$ is a methyl group, a cyclohexyl group, or an octyl group).

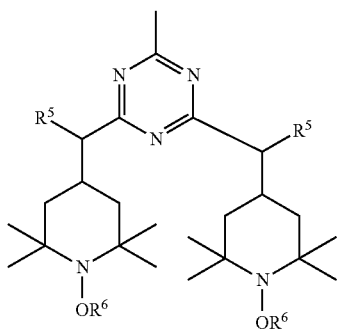

(2)

Specific examples of the s-triazine moiety T expressed by the general formula (2) include
2,4-bis[(1-methoxy-2,2,6,6-tetramethylpiperidine-4-yl)n-butylamino]-s-triazine,
2,4-bis[(1-cyclohexyloxy-2,2,6,6-tetramethylpiperidine-4-yl)n-butylamino]-s-triazine,
and 2,4-bis[(1-octyloxy-2,2,6,6-tetramethylpiperidine-4-yl) n-butylamino]-s-triazine.

Specific examples of the sterically hindered amine ether flame retardant expressed by the general formula (1) include
N,N',N"-tris{2,4-bis[(1-cyclohexyloxy-2,2,6,6-tetramethylpiperidine-4-yl)n-butylamino]-s-triazine-6-yl}-3,3'-ethylenediiminopropylamine,
N,N',N"-tris {2,4-bis[(1-cyclohexyloxy-2,2,6,6-tetramethylpiperidine-4-yl)n-butylamino]-s-triazine-6-yl}-3,3'-ethylenediiminodipropylamine,
N,N',N"-tris{2,4-bis[(1-octyloxy-2,2,6,6-tetramethylpiperidine-4-yl)n-butylamino]-s-triazine-6-yl}-3,3'-ethylenediiminodipropylamine,
N,N',N"-tris{2,4-bis[(1-octyloxy-2,2,6,6-tetramethylpiperidine-4-yl)n-butylamino]-s-triazine-6-yl}-3,3'-ethylenediiminopropylamine,
N,N',N"-tris{2,4-bis[(1-methoxy-2,2,6,6-tetramethylpiperidine-4-yl)n-butylamino]-s-tri azine-6-yl}-3,3'-ethylenediiminopropylamine, and
N,N',N"-tris {2,4-bis[(1-methoxy-2,2,6,6-tetramethylpiperidine-4-yl) n-butylamino]-s-triazine-6-yl}-3,3'-ethylenediiminopropylamine. They may be used individually or in combination of two or more.

The amount of the sterically hindered amine ether flame retardant used in the present invention is preferably 0.01 parts by weight to 20 parts by weight, more preferably 0.02 parts by weight to 10 parts by weight, and even more preferably 0.05 parts by weight to 5 parts by weight per 100 parts by weight of the polyolefin-based resin. If the amount of the flame retardant is less than 0.01 parts by weight, sufficient flame resistance may not be achieved. If the amount of the flame retardant is more than 20 parts by weight, it is likely that the mechanical strength is reduced, and the in-mold expansion moldability is deteriorated (particularly the deterioration of the surface appearance) because the cell diameter is finer. Thus, the cost is increased, which results in an economic disadvantage.

In the present invention, the sterically hindered amine ether flame retardant may be added to the polyolefin-based resin either directly or indirectly. In an indirect method, a polyolefin-based resin masterbatch containing, e.g., 5 wt % to 50 wt % of the sterically hindered amine ether flame retardant is prepared, and then added to the polyolefin-based resin. For ease of addition, the indirect method is preferred.

The present invention uses the sterically hindered amine ether flame retardant in combination with the phosphoric ester, and thus can achieve excellent flame retardant performance compared to the conventional techniques even in the case of an in-mold expansion molded article having a higher density or a larger thickness.

Examples of the phosphoric ester used in the present invention include the following: aliphatic phosphoric esters such as trimethyl phosphate, triethyl phosphate, triisopropyl phosphate, trineopentyl phosphate, tri-tert-butyl phosphate, tributoxyethyl phosphate, triisobutyl phosphate, and tri(2-ethylhexyl)phosphate; aromatic phosphoric esters such as triphenyl phosphate, tricresyl phosphate, trixylenyl phosphate, cresyl diphenyl phosphate, tert-butylphenyl diphenyl phosphate, bis-(tert-butyilphenyl)phenyl phosphate, tris-(tert-butylphenyl)phosphate, isopropylphenyl diphenyl phosphate, bis-(isopropylphenyl)diphenyl phosphate, tris-(isopropylphenyl)phosphate, cresyl diphenyl phosphate, and cresyldi-2,6-dixylenyl phosphate; and a phosphoric ester having both aromatic and aliphatic hydrocarbon groups in a molecule such as 2-ethylhexyl diphenyl phosphate. In the following, the aromatic phosphoric ester along with the phosphoric ester having both aromatic and aliphatic hydrocarbon groups in a molecule may be referred to as "aromatic-based phosphoric ester". These phosphoric esters may be used individually or in combination of two or more.

The phosphoric ester used in the present invention is not particularly limited as long as it can withstand extrusion kneading and decomposition in an aqueous dispersion medium. In terms of the volatility, the phosphoric ester having a molecular weight of 300 or more is preferred. Moreover, in terms of the dispersibility in the polyolefin-based resin, the high temperature stability, the volatility, or the like, the phosphoric ester is preferably the aromatic-based phosphoric ester, more preferably the aromatic phosphoric ester, and even more preferably a condensed phosphoric ester containing at least two phosphate sites of the aromatic phosphoric ester in a molecule.

Specific examples of the condensed phosphoric ester used in the present invention have structures expressed by the following general formulas (3) and (4), and can be suitably used.

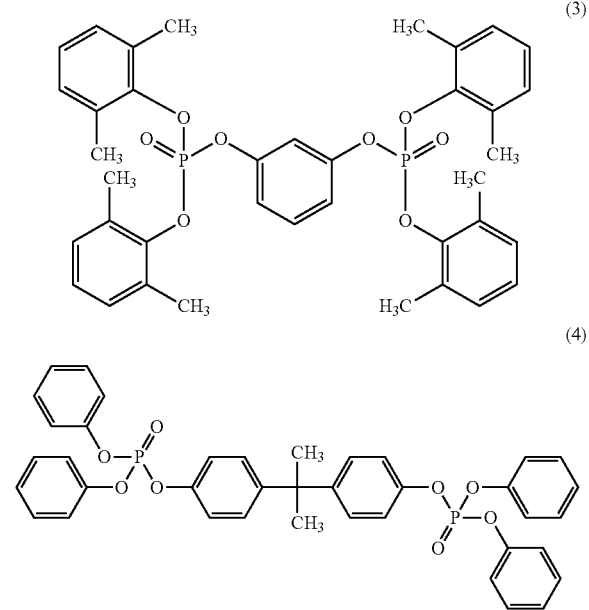

In terms of the volatility, the hydrolysis resistance, or the like, it is more preferable that the aromatic phosphoric ester has an alkyl group on the benzene ring of the aromatic hydrocarbon radical. Examples of the alkyl group include methyl group, ethyl group, propyl group, butyl group, n-pentyl group, n-hexyl group, n-heptyl group, nonyl group, decyl group, undecyl group, dodecyl group, isopropyl group, isobutyl group, sec-butyl group, tert-butyl group, 2-ethylbutyl group, isopentyl group, 1-methylpentyl group, 1,3-dimethylbutyl group, 1-methylhexyl group, isoheptyl group, 1,1,3,3-tetramethylpentyl group, 1-methylundecyl group, and 1,1,3,3,5,5-hexamethylhexyl group.

The present invention uses the phosphoric ester that is easily hydrolyzed as the flame retardant. In general, a system using the phosphoric ester is required to eliminate moisture as much as possible to suppress a reduction in flame resistance due to hydrolysis. Surprisingly, however, the present invention can achieve stable flame resistance even if the polyolefin-based resin particles including the phosphoric ester that is easily hydrolyzed are heated under pressure in the aqueous dispersion medium.

This is because the expansion temperature can be kept low by expansion under reduced pressure, which is an expansion process of the present invention, even if the polyolefin-based resin particles including the phosphoric ester are heated under pressure in the aqueous dispersion medium. In the expansion under reduced pressure, the polyolefin-based resin particles can be generally expanded at about 100° C. to 160° C., although the temperature depends on the melting point of the polypropylene-based resin used, and therefore it is considered that the phosphoric ester is not likely to be hydrolyzed even by heating under pressure in the aqueous dispersion medium.

The amount of the phosphoric ester used in the present invention is preferably 0.01 parts by weight to 10 parts by weight, more preferably 0.02 parts by weight to 5 parts by weight, and even more preferably 0.03 parts by weight to 3 parts by weight per 100 parts by weight of the polyolefin-based resin. If the amount of the phosphoric ester is less than 0.01 parts by weight, sufficient flame resistance may not be achieved. If the amount of the phosphoric ester is more than 10 parts by weight, it is likely that the mechanical strength is reduced, and the in-mold expansion moldability is deteriorated (such as particularly the deterioration of the surface appearance and the increase of the dimensional shrinkage) because the cell diameter is finer. Thus, the cost is increased, which results in an economic disadvantage.

The phosphoric ester may be added to the polyolefin-based resin either directly or indirectly. In an indirect method, a polyolefin-based resin masterbatch containing, e.g., 5 wt % to 50 wt % of the phosphoric ester is prepared, and then added to the polyolefin-based resin. For ease of addition, the indirect method is preferred.

In the present invention, flame retardants and flame retardant aids other than the above flame retardants may be further added as needed. Examples of the additional flame retardant and flame retardant aid include the following: phosphorus-containing compounds having a phosphorus atom in a molecule such as red phosphorus, a phosphorus oxide, a phosphoric acid compound, phosphates, phosphazenes, amine phosphates, amide phosphates, a trivalent aliphatic phosphorus compound, and a trivalent aromatic phosphorus compound; nitrogen-containing compounds having a nitrogen atom in a molecule such as a cyanuric acid or an isocyanuric acid and a derivative thereof, salts of a cyanuric acid or an isocyanuric acid and a derivative thereof, a compound having a triazine skeleton, an azo compound, tetrazole amine salts, tetrazole metal salts, and a tetrazole compound; boron compounds having a boron atom in a molecule such as a boric acid compound, borates, hydrates of the boric acid compound and the borates, derivatives of the boric acid compound, the borates, and the hydrates, and boron oxides; halogen compounds having a halogen atom (e.g., chlorine, bromine, or fluorine) in a molecule such as halogenated aliphatic compounds and derivatives thereof, halogenated aromatic compounds and derivatives thereof, halogenated bisphenols and derivatives thereof, a halogenated bishpenol derivative oligomer, a halogenated acrylic resin, a halogenated epoxy resin, a halogenated polystyrene resin, chlorinated paraffin, and polytetrafluoroethylene; a compound that is formed by combining the above flame retardants and has at least two types of phosphorus, nitrogen, boron, and halogen atoms in a molecule; inorganic flame retardants such as a metal hydroxide and a metal oxide; an antimony trioxide; carbon black; a polyhydric alcohol; and glycols.

In the present invention, any of the following additives may be added as need to the polyolefin-based resin to the extent that the effect of the present invention is not impaired, thereby providing a polyolefin-based resin composition. Examples of the additives include a nucleating agent such as talc, stabilizers such as an antioxidant, a metal deactivator, a phosphorus-based processing stabilizer, an ultraviolet absorber, an ultraviolet stabilizer, a fluorescent brightener, and a metal soap, a cross-linking agent, a chain transfer agent, a lubricant, a plasticizer, a filler, a reinforcing agent, an inorganic pigment, an organic pigment, a conductivity improving agent, a flame resistance improving agent, and a surface-active or polymeric antistatic agent.

For ease of pre-expansion of the polyolefin-based resin composition, in general, the polyolefin-based resin is melted and mixed with the sterically hindered amine ether flame retardant, the phosphoric ester, and optionally the above additives in advance by using an extruder, a kneader, a Banbury mixer, a roller, or the like. Then, the resultant mixture is formed into polyolefin-based resin particles having a desired particle shape such as a cylinder, an ellipse, a sphere, a cube, or a rectangular parallelepiped. The average particle weight of the polyolefin-based resin particles is preferably 0.5 mg to 3.0 mg, and more preferably 0.5 mg to 2.0 mg.

The method for producing the polyolefin-based resin pre-expanded particles of the present invention is not particularly limited, and so-called expansion under reduced pressure is preferred. In this method, the polyolefin-based resin particles are dispersed in a dispersion medium with a dispersing agent or the like in the presence of a blowing agent in a closed container, and heated to a predetermined expansion temperature under pressure so that the resin particles are impregnated with the blowing agent. Thereafter, the dispersion in the closed container is released into a low pressure region and the polyolefin-based resin particles are expanded, while the temperature and the pressure in the container are maintained constant.

The heating temperature in the closed container is preferably in the range of (the melting point of the polyolefin-based resin particles−25° C.) to (the melting point of the polyolefin-based resin particles+25° C.), and more preferably in the range of (the melting point of the polyolefin-based resin particles−15° C.) to (the melting point of the polyolefin-based resin particles+15° C.). By heating the polyolefin-based resin particles to this temperature under pressure, the polyolefin-based resin particles are impregnated with the blowing agent. Thereafter, one end of the closed container is opened so that the polyolefin-based resin particles are released into the atmosphere where the pressure is lower than that in the closed container. Thus, the polyolefin-based resin pre-expanded particles can be produced.

The closed container in which the polyolefin-based resin particles are dispersed is not particularly limited as long as it can withstand the pressure and the temperature during the production of the polyolefin-based resin pre-expanded particles. The closed container can be, e.g., an autoclave.

The dispersion medium can be, e.g., methanol, ethanol, ethylene glycol, glycerin, or water. In particular, water is preferred.

It is preferable that a dispersing agent is used in the dispersion medium to prevent coalescence of the polyolefin-based resin particles. Examples of the dispersing agent include inorganic dispersing agents such as tribasic calcium phosphate, magnesium phosphate, basic magnesium carbonate, calcium carbonate, barium sulfate, kaoline, talc, and clay.

Moreover, a dispersing aid may be used as needed. Examples of the dispersing aid include sodium dodecylbenzenesulfonate, sodium n-paraffinsulfonate, sodium α-olefinsulfonate, magnesium sulfate, magnesium nitrate, magnesium chloride, aluminum sulfate, aluminum nitrate, aluminum chloride, iron sulfate, iron nitrate, and iron chloride. In particular, the tribasic calcium phosphate and the sodium n-paraffinsulfonate are preferably used in combination.

The amounts of the dispersing agent and the dispersing aid vary depending on the types thereof and the type and amount of the polyolefin-based resin used. In general, the amount of the dispersing agent is preferably 0.2 parts by weight to 3 parts by weight per 100 parts by weight of the dispersion medium, and the amount of the dispersing aid is preferably 0.001 parts by weight to 0.1 parts by weight per 100 parts by weight of the dispersion medium. By controlling the amounts of the dispersing agent and the dispersing aid in the above ranges, the dispersion stability can be ensured, and the dispersing agent is not likely to be attached to the surfaces of the pre-expanded particles. Accordingly, the fusion of the pre-expanded particles may not be impaired during in-mold expansion molding.

In general, the polyolefin-based resin particles are preferably used in an amount of 20 parts by weight to 100 parts by weight per 100 parts by weight of the dispersion medium so as to ensure good dispersibility in the dispersion medium.

The present invention uses the sterically hindered amine ether flame retardant in combination with the phosphoric ester, and thus can reduce the amount of the dispersing agent attached to the pre-expanded particles compared to the conventional techniques. If a large amount of the dispersing agent is attached to the pre-expanded particles, the fusion of the pre-expanded particles may be impaired during in-mold expansion molding. The general production of the pre-expanded particles requires a washing process of the pre-expanded particles to reduce the amount of the dispersing agent attached to the pre-expanded particles. However, according to the amount of the dispersing agent attached to the pre-expanded particles of the present invention, the washing time can be shortened, and the use of the agent and the solvent also can be reduced, thereby reducing the environmental load and the cost.

In the production of the polyolefin-based resin pre-expanded particles, the blowing agent is not particularly limited. Examples of the blowing agent include aliphatic hydrocarbons such as propane, isobutane, normal butane, isopentane, and normal pentane, inorganic gas such as air, nitrogen, and carbon dioxide, water, and a mixture of these materials. The amount of the blowing agent varies depending on the resin used, the blowing agent, and the desired expansion ratio, and may be appropriately determined in accordance with the desired expansion ratio of the polyolefin-based resin pre-expanded particles. In general, the amount of the blowing agent is preferably 1 part by weight to 60 parts by weight per 100 parts by weight of the polyolefin-based resin particles.

As the blowing agent used in the present invention, the aliphatic hydrocarbons such as isobutane and normal butane and carbon dioxide are particularly preferred. Since these blowing agents accelerate the plasticization of the polyolefin-based resin, the polyolefin-based resin particles can be expanded at a lower pressure and a lower temperature compared to the case of using only water, air, or nitrogen as the blowing agent. Consequently, the hydrolysis of the phosphoric ester can be further suppressed, and more stable flame resistance can be achieved.

When water is used as the blowing agent, it is preferable that at least one compound selected from a hydrophilic polymer, a polyhydric alcohol, and a compound having a triazine skeleton is added to the polyolefin-based resin particles in order to provide the polyolefin-based resin pre-expanded particles with a high expansion ratio.

Examples of the hydrophilic polymer include carboxyl group containing polymers such as an ethylene-acrylic acid-maleic anhydride ternary copolymer, an ethylene-(meth) acrylic acid copolymer, and an ionomer resin obtained by crosslinking an ethylene-(meth)acrylic acid copolymer with a metal ion, and polyethylene glycol. They may be used individually or in combination of two or more.

The amount of the hydrophilic polymer depends on the type of the hydrophilic polymer and is not particularly limited. In general, the amount of the hydrophilic polymer is preferably 0.01 parts by weight to 20 parts by weight, and more preferably 0.1 parts by weight to 5 parts by weight per 100 parts by weight of the polyolefin-based resin particles. If the amount of the hydrophilic polymer is less than 0.01 parts by weight, it may be difficult to provide the polyolefin-based resin pre-expanded particles with a high expansion ratio. If the amount of the hydrophilic polymer is more than 20 parts by weight, the heat resistance and the mechanical strength can be significantly reduced.

Examples of the polyhydric alcohol include ethylene glycol, glycerin, erythritol, and pentaerythritol. They may be used individually or in combination of two or more.

The amount of the polyhydric alcohol depends on the type of the polyhydric alcohol and is not particularly limited. In general, the amount of the polyhydric alcohol is preferably 0.01 parts by weight to 10 parts by weight, and more preferably 0.1 parts by weight to 2 parts by weight per 100 parts by weight of the polyolefin-based resin particles. If the amount of the polyhydric alcohol is less than 0.01 parts by weight, it may be difficult to provide the polyolefin-based resin pre-expanded particles with a high expansion ratio. If the amount of the polyhydric alcohol is more than 10 parts by weight, the heat resistance and the mechanical strength can be significantly reduced.

The preferred compound having a triazine skeleton has a molecular weight of 300 or less per unit triazine skeleton. In this case, the molecular weight per unit triazine skeleton is a value obtained by dividing the molecular weight by the number of triazine skeletons contained in a molecule. If the molecular weight per unit triazine skeleton is more than 300, a variation in expansion ratio and a variation in cell diameter may be considerable. Examples of the compound having a molecular weight of 300 or less per unit triazine skeleton include melamine (chemical name: 1,3,5-triazine-2,4,6-triamine), ammeline (chemical name: 1,3,5-triazine-2-hydroxy-4,6-diamine), ammelide (chemical name: 1,3,5-triazine-2,4-hydroxy-6-amine), cyanuric acid (chemical name: 1,3,5-triazine-2,4,6-triol), tris(methyl)cyanurate, tris(ethyl)cyanurate, tris(butyl)cyanurate, tris(2-hydroxyethyl)cyanurate, and melamine-isocyanuric acid condensation product. They may be used individually or in combination of two or more. Among them, the melamine, the isocyanuric acid, and the melamine-isocyanuric acid condensation product are preferred so as to provide the polyolefin-based resin pre-expanded particles with a high expansion ratio by reducing the variation in expansion ratio and the variation in cell diameter.

The amount of the compound having a triazine skeleton depends on the type of the compound having a triazine skeleton and is not particularly limited. In general, the amount of the compound having a triazine skeleton is preferably 0.01 parts by weight to 15 parts by weight, and more preferably 0.1 parts by weight to 3 parts by weight per 100 parts by weight of the polyolefin-based resin particles. If the amount of the compound having a triazine skeleton is less than 0.01 parts by weight, it may be difficult to provide the polyolefin-based resin pre-expanded particles with a high expansion ratio. If the amount of the compound having a triazine skeleton is more than 15 parts by weight, the heat resistance and the mechanical strength can be significantly reduced.

When the carbon dioxide is used as the blowing agent, borax, zinc borate, glycerin, and low molecular weight hydrophilic materials such as polyethylene glycol having a molecular weight of 300 or less can be added to the polyolefin-based resin, thereby providing the polyolefin-based resin pre-expanded particles with a high expansion ratio and a uniform cell diameter.

The expansion ratio of the polyolefin-based resin pre-expanded particles obtained by the above production method is preferably 5 times to 50 times, and more preferably 7 times to 45 times.

The polyolefin-based resin pre-expanded particles with a higher expansion ratio may be produced, e.g., by a two-stage expansion process. In the two-stage expansion process, first, polyolefin-based resin pre-expanded particles with an expansion ratio of 5 times to 35 times are produced. Then, the polyolefin-based resin pre-expanded particles are placed in a closed container and pressurized so that nitrogen, air, or the like is impregnated into the pre-expanded particles, and thus the pressure inside the pre-expanded particles becomes higher than the normal pressure. Subsequently, the polyolefin-based resin pre-expanded particles are further expanded by heating with steam or the like.

The expansion ratio is determined in the following manner. The weight w (g) of the polyolefin-based resin pre-expanded particles and the volume v ($cm^3$) of the polyolefin-based resin pre-expanded particles immersed in ethanol are measured. Then, the expansion ratio is calculated by the following equation, where d ($g/cm^3$) represents the density of the polyolefin-based resin particles before expansion.

$$\text{Expansion ratio} = d \times v / w$$

The average cell diameter of the polyolefin-based resin pre-expanded particles of the present invention is preferably 50 m to 800 m, and more preferably 100 m to 600 m. The average cell diameter is determined in the following manner. Thirty pre-expanded particles are randomly taken out of the polyolefin-based resin pre-expanded particles, and the cell diameters are measured in accordance with JIS K6402. Thus, the average cell diameter is calculated.

The closed cell ratio of the polyolefin-based resin pre-expanded particles of the present invention is preferably 88% or more, and more preferably 93% or more. The closed cell ratio is determined in the following manner. The volume of the closed cells of the polyolefin-based resin pre-expanded particles is measured with an air comparison pycnometer. On the other hand, the apparent volume of the polyolefin-based resin pre-expanded particles is determined by an ethanol immersion method. The closed cell ratio is calculated by dividing the closed cell volume by the apparent volume.

In the differential scanning calorimetry of the polyolefin-based resin pre-expanded particles of the present invention, it is preferable that a DSC curve obtained when the temperature of 5 to 6 mg of the polyolefin-based resin pre-expanded particles is increased from 40° C. to 220° C. at a rate of 10° C./min has two melting peaks.

The DSC ratio of the polyolefin-based resin pre-expanded particles of the present invention is preferably 13% to 50%, and more preferably 18% to 40%. If the DSC ratio is within this range, the polyolefin-based resin in-mold expansion molded article is likely to have an aesthetically pleasing surface. The DSC ratio is determined in the following manner. Tangent lines are drawn from a point on the DSC curve where the endothermic amount is the smallest between the two melting peaks to the DSC curve on the low temperature side and the high temperature side, respectively. The low-temperature area enclosed by the DSC curve and the tangent line extending to the low temperature side is defined as a heat quantity Ql of the melting peak on the low temperature side. The high-temperature area enclosed by the DSC curve and the tangent line extending to the high temperature side is defined as a heat quantity Qh of the melting peak on the high temperature side. The DSC ratio is a ratio of the melting peak on the high temperature side [Qh/(Ql+Qh)×100] calculated from the heat quantities Ql and Qh.

The polyolefin-based resin pre-expanded particles of the present invention can be formed into a polyolefin-based resin in-mold expansion molded article by in-mold expansion molding.

The in-mold expansion molding of the polyolefin-based resin pre-expanded particles of the present invention may be performed by conventionally known methods, e.g., a) using the polyolefin-based resin pre-expanded particles as they are, b) impregnating inorganic gas such as air into the pre-expanded particles to impart expandability to them in advance, or c) filling the pre-expanded particles in a compressed state into a mold.

A specific method for forming a polyolefin-based resin in-mold expansion molded article from the polyolefin-based resin pre-expanded particles of the present invention can be as follows. For example, the polyolefin-based resin pre-expanded particles are placed in a pressure vessel and pressurized by air in advance, so that the air is impregnated into the pre-expanded particles to impart expandability to them. The resultant pre-expanded particles are filled into a molding space that is provided between two molds, and can be closed but not hermetically sealed. Then, the pre-expanded particles are heated with steam or the like (as a heating medium) at a steam pressure of about 0.10 to 0.4 MPa (G) for about 3 to 30 seconds, and thus molded and fused together. Subsequently, the molds are cooled, e.g., by water cooling and opened, thereby providing the polyolefin-based resin in-mold expansion molded article.

The density of the polyolefin-based resin in-mold expansion molded article obtained from the polyolefin-based resin pre-expanded particles of the present invention is preferably 10 kg/m$^3$ to 300 kg/m$^3$, and more preferably 15 kg/m$^3$ to 250 kg/m$^3$, and even more preferably 15 kg/m$^3$ to 150 kg/m$^3$.

When the polyolefin-based resin in-mold expansion molded article of the present invention is tested in accordance with the UL94 horizontal burning test for foamed materials (UL94 HF), it can meet HF-2 in a wider range of thickness and density than a conventional molded article.

EXAMPLES

Next, the present invention will be described based on Examples and Comparative Examples. However, the present invention is not limited to the following Examples.

In Examples and Comparative Examples, the following materials were used without any particular treatment such as purification.

Polyolefin-based resin: ethylene-propylene random copolymer [with an ethylene content of 2.8%, a MFR of 6.0 g/10 min, and a melting point of 145° C.]

Sterically hindered amine ether flame retardant [FLAMESTAB NOR 116 produced by Ciba Japan Ltd. (BASF Japan Ltd.); general formula (5)]

Phosphoric ester [PX-200 (molecular weight: 687, P %: 9.0%) produced by DAIHACHI CHEMICAL INDUSTRY CO., LTD.; general formula (3)]

Ammonium polyphosphate [produced by SUZUHIRO CHEMICAL CO., LTD.]

Magnesium hydroxide [produced by Kyowa Chemical Industry Co., Ltd.]

Carbon black [produced by SUMIKA COLOR CO., LTD.]

Powdery tribasic calcium phosphate [produced by TAIHEI CHEMICAL INDUSTRIAL CO., LTD.]

Sodium n-paraffinsulfonate [LATEMUL PS produced by Kao Corporation]

The evaluations of Examples and Comparative Examples were performed in the following manner.

(DSC Ratio)

Using a differential scanning calorimeter, the temperature of 5 to 6 mg of the polyolefin-based resin pre-expanded particles was increased from 40° C. to 220° C. at a rate of 10° C./min, so that a DSC curve (see FIG. 1) was obtained. The DSC curve had two melting peaks, and the DSC ratio was calculated by the following equation, where Ql represents the heat quantity of the melting peak on the low temperature side and Qh represents the heat quantity of the melting peak on the high temperature side.

DSC ratio=$Qh/(Ql+Qh)\times100$ (Expansion Ratio)

The weight w (g) of the polyolefin-based resin pre-expanded particles and the volume v (cm$^3$) of the polyolefin-based resin pre-expanded particles immersed in ethanol were measured. Then, the expansion ratio was calculated by the following equation, where d (g/cm$^3$) represents the density of the polyolefin-based resin particles before expansion.

Expansion ratio=$d\times v/w$ (Average Cell Diameter)

Thirty pre-expanded particles were randomly taken out of the polyolefin-based resin pre-expanded particles produced, and the cell diameters were measured in accordance with JIS K6402. Thus, the average cell diameter was calculated.

(Closed Cell Ratio)

The volume of the closed cells of the polyolefin-based resin pre-expanded particles produced was measured with an air comparison pycnometer (Model 930 manufactured by Beckman Coulter, Inc.). On the other hand, the apparent volume of the polyolefin-based resin pre-expanded particles was determined by an ethanol immersion method. The closed cell ratio was calculated by dividing the closed cell volume by the apparent volume.

(Amount of Dispersing Agent Attached to Pre-Expanded Particles)

The polyolefin-based resin pre-expanded particles were washed with running water for 30 seconds, and then dried in an oven at 60° C. for 24 hours. Immediately after being taken out of the oven, the pre-expanded particles were allowed to stand in a thermo-hygrostat at 23° C. and 50% RH for 72 hours. Next, in the thermo-hygrostat, about 100 g of the pre-expanded particles were accurately weighed to the third decimal place, and the weight of the pre-expanded particles to which the dispersing agent was attached was represented by F (g). Thereafter, the total amount of the pre-expanded particles thus weighed was immersed in 5 L of 1N hydrochloric acid solution for 10 minutes, then immersed in 5 L of ion-exchanged water for 1 minute to wash off the hydrochloric acid solution, and further immersed in 5 L of 1N sodium hydroxide solution for 10 minutes. A series of the operations was repeated twice, and the total amount of the resultant pre-expanded particles was dried in an oven at 60° C. for 24 hours. Immediately after being taken out of the oven, the pre-expanded particles were allowed to stand in a thermo-hygrostat at 23° C. and 50% RH for 72 hours. Next, in the thermo-hygrostat, the pre-expanded particles were accurately weighed to the third decimal place, and the weight of the pre-expanded particles after acid and alkali washing was represented by S (g). The difference between the weight F (g) after water washing and the weight S (g) after acid and alkali washing was calculated by the following equation as an amount of the dispersing agent attached to the surfaces of the pre-expanded particles.

Amount of dispersing agent attached to pre-expanded particles (ppm)=$(F-S)/F \times 10^6$ (Surface Appearance)

The surface of the in-mold expansion molded article was visually observed and evaluated based on the following criteria.

○: The surface was free from unevenness, and there was almost no void between the particles.

x: The surface was uneven, and there was a very large void between the particles.

(Fusion)

The in-mold expansion molded article produced was fractured, and the cross section was observed. Then, the proportion of the number of broken particles to the total number of particles present at the cross section was determined and evaluated based on the following criteria.

○: The proportion of the broken particles was 60% or more.

x: The proportion of the broken particles was less than 60%.

(Molded Article Density)

The in-mold expansion molded article produced was cut to a length of 150 mm, a width of 50 mm, and an intended thickness as a burning test sample. The weight w (g) of the sample was measured, and the volume v (cm³) was obtained from the length, the width, and the thickness of the sample. The molded article density was calculated by the following equation.

Molded article density=$w/v$ (g/cm³)

The burning test samples having the above dimensions (thickness: 3.5 mm, 7 mm, 13 mm) were tested in accordance with UL94 HF and evaluated based on the following criteria.

Afterflame time: The period of time between when the fire of a gas burner was extinguished and when the fire of each of the samples was extinguished was defined as an afterflame time, and the average of the afterflame times of five tests was calculated.

The flame retardant performance is higher as the afterflame time is shorter.

Examples 1 to 5

[Production of Resin Particles]

100 parts by weight of a polyolefin-based resin (i.e., an ethylene-propylene random copolymer with an ethylene content of 2.8%, a MFR of 6.0 g/10 min, and a melting point of 145° C.) were mixed with 0.01 parts by weight of talc as a nucleating agent, a phosphoric ester (PX-200 (molecular weight: 687, P %: 9.0%) produced by DAIHACHI CHEMICAL INDUSTRY CO., LTD.) expressed by the general formula (3):

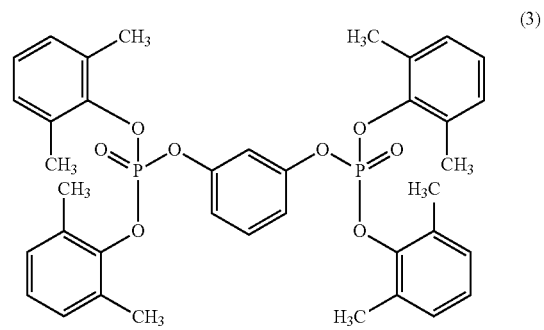

at a compounding ratio shown in Table 1, a compound (FLAMESTAB NOR 116 produced by Ciba Japan Ltd. (BASF Japan Ltd.)) expressed by the following general formula (5):

$$RNHCH_2CH_2CH_2NRCH_2CH_2NHCH_2CH_2CH_2NHR \quad (5)$$

(where R is an s-triazine moiety T expressed by the following general formula (6))

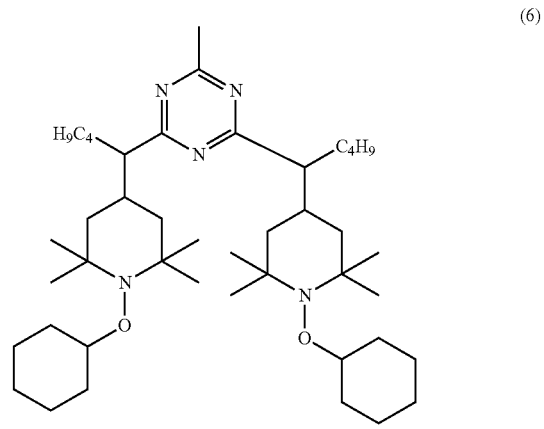

at a compounding ratio shown in Table 1, and a carbon black (40% masterbatch) at a compounding ratio shown in Table 1. The mixture was kneaded by a 50 mm φ single screw extruder, and then granulated into polyolefin-based resin particles (1.2 mg/grain).

[Production of Pre-Expanded Particles]

A 10 L closed container was charged with 100 parts by weight of the resin particles thus produced, 10 parts by weight of isobutane, 300 parts by weight of water, 1.6 parts by weight of powdery tribasic calcium phosphate, and 0.03 parts by weight of sodium n-paraffinsulfonate, and the inside of the closed container was heated to an expansion temperature shown in Table 1. Then, the pressure in the container was adjusted to a predetermined expansion pressure shown in Table 1 by injecting isobutane into the container. Subsequently, while the pressure in the container was maintained with nitrogen, a valve provided on the lower portion of the closed container was opened so that the aqueous dispersion was released into the atmosphere through an orifice plate having openings of 4.0 mm φ diameter, thereby providing polyolefin-based resin pre-expanded particles. The polyolefin-based resin pre-expanded particles were evaluated as described above. Table 2 shows the results.

[Production of In-Mold Expansion Molded Article]

Next, the polyolefin-based resin pre-expanded particles thus produced were washed with 0.1N hydrochloric acid solution. Moreover, the pre-expanded particles were placed in a pressure vessel and pressurized by air at an internal pressure of 0.18 to 0.23 MPa. Then, the pre-expanded particles were filled into a mold of 400 mm×300 mm×22 mm, heated with steam at 0.28 MPa (G) for 10 seconds, and fused together to form a polyolefin-based resin in-mold expansion molded article. With respect to the in-mold expansion molded article thus produced, the surface appearance, the fusion rate, the molded article density, and the burning test were evaluated. Table 2 shows the results.

Comparative Examples 1 to 5

[Production of Resin Particles]

The compounds expressed by the general formulas (3) and (5) used in Examples, various flame retardants (magnesium hydroxide and ammonium polyphosphate), and carbon black were added at their respective ratios shown in Table 1, and thus resin particles were produced in the same manner as Examples.

[Production of Pre-Expanded Particles]

Polyolefin-based resin pre-expanded particles were produced in the same manner as Examples except that the expansion temperature and the expansion pressure were changed to the conditions shown in Table 2. The polyolefin-based resin pre-expanded particles were evaluated as described above. Table 2 shows the results.

[Production of In-Mold Expansion Molded Article]

A polyolefin-based resin in-mold expansion molded article was produced in the same manner as Examples. With respect to the in-mold expansion molded article thus produced, the surface appearance, the fusion rate, the molded article density, and the burning test were evaluated. Table 2 shows the results.

TABLE 1

| | Phosphoric ester (parts by weight) | Sterically hindered amine ether flame retardant (parts by weight) | Ammonium polyphosphate (parts by weight) | Magnesium hydroxide (parts by weight) | Carbon black (parts by weight) | Melting point of polyolefin-based resin (° C.) | Expansion temperature (° C.) | Expansion pressure (MPa) |
|---|---|---|---|---|---|---|---|---|
| Example 1 | 1.0 | 2.0 | 0.0 | 0.0 | 0.3 | 143.2 | 146.1 | 1.37 |
| Example 2 | 1.0 | 2.0 | 0.0 | 0.0 | 0.3 | 143.2 | 146.4 | 1.38 |
| Example 3 | 1.0 | 2.0 | 0.0 | 0.0 | 0.3 | 143.2 | 146.5 | 1.40 |
| Example 4 | 3.0 | 2.0 | 0.0 | 0.0 | 0.3 | 142.6 | 145.6 | 1.39 |
| Example 5 | 0.5 | 2.0 | 0.0 | 0.0 | 0.3 | 143.8 | 146.5 | 1.38 |
| Comparative Example 1 | 0.0 | 2.0 | 0.0 | 0.0 | 0.3 | 144.1 | 146.8 | 1.36 |
| Comparative Example 2 | 0.0 | 2.0 | 0.0 | 0.0 | 0.3 | 144.1 | 146.7 | 1.39 |
| Comparative Example 3 | 0.0 | 2.0 | 1.0 | 0.0 | 0.3 | 144.2 | 147.5 | 1.20 |
| Comparative Example 4 | 0.0 | 2.0 | 0.0 | 15.0 | 0.3 | 143.2 | 147.1 | 1.27 |
| Comparative Example 5 | 1.0 | 0.0 | 0.0 | 0.0 | 0.3 | 143.8 | 146.7 | 1.39 |

TABLE 2

| | Pre-expanded particles | | | | In-mold expansion molded article | | | | Flame resistance evaluation (afterflame time/sec) Sample thickness | | |
|---|---|---|---|---|---|---|---|---|---|---|---|
| | DSC ratio (%) | Expansion ratio | Average cell diameter (μm) | Closed cell ratio (%) | Amount of dispersing agent attached (ppm) | Surface appearance | Fusion | Molded article density (g/cm³) | 3.5 mm | 7 mm | 13 mm |
| Example 1 | 27.1 | 9.1 | 223 | 99.7 | 1080 | ○ | ○ | 0.071 | 0 | 0 | 10 |
| Example 2 | 26.1 | 11.3 | 215 | 99.6 | 1110 | ○ | ○ | 0.060 | 0 | 0 | 4 |
| Example 3 | 20.3 | 14.1 | 247 | 99.6 | 1180 | ○ | ○ | 0.045 | 0 | 0 | 0 |
| Example 4 | 23.0 | 13.2 | 230 | 99.1 | 980 | ○ | ○ | 0.051 | 0 | 0 | 0 |
| Example 5 | 22.8 | 13.4 | 218 | 99.7 | 1200 | ○ | ○ | 0.050 | 0 | 0 | 1 |
| Comparative Example 1 | 28.4 | 11.1 | 211 | 99.6 | 1580 | ○ | ○ | 0.060 | 0 | 21 | 50 |
| Comparative Example 2 | 28.1 | 14.2 | 228 | 99.8 | 1620 | ○ | ○ | 0.046 | 0 | 5 | 28 |
| Comparative Example 3 | 28.6 | 14.4 | 210 | 97.1 | 520 | X | ○ | 0.045 | 0 | 4 | 30 |
| Comparative Example 4 | 26.7 | 13.8 | 121 | 98.8 | 3200 | ○ | X | 0.048 | 20 | 39 | 88 |
| Comparative Example 5 | 25.2 | 12.8 | 260 | 99.6 | 1200 | ○ | ○ | 0.053 | 31 | 70 | 129 |

Examples 1 to 5 using the sterically hindered amine ether flame retardant in combination with the phosphoric ester showed good flame retardant performance compared to Comparative Example 1 to 2 using the sterically hindered amine ether flame retardant alone and Comparative Example 5 using the phosphoric ester alone. In Comparative Examples 3 to 4 using the sterically hindered amine ether flame retardant and the magnesium hydroxide or the ammonium polyphosphate, a favorable in-mold expansion molded article was not produced, and the flame retardant performance was not improved.

Moreover, the amount of dispersing agent attached to the pre-expanded particles was smaller in Examples 1 to 5 using the sterically hindered amine ether flame retardant in combination with the phosphoric ester than in Comparative Examples 1 to 2 using no phosphoric ester. Thus, it can be expected that the washing process will be shortened, and also the amount of the agent will be reduced.

INDUSTRIAL APPLICABILITY

The use of the polyolefin-based resin pre-expanded particles of the present invention can provide an in-mold expansion molded article that has excellent flame resistance compared to the conventional expansion molded article even in the case of a sample having a higher density or a larger thickness while maintaining good in-mold expansion moldability and surface appearance that are comparable to those of a conventional expansion molded article.

What is claimed is:

1. A method for producing polypropylene-based resin pre-expanded particles comprising:
    dispersing polypropylene-based resin particles into an aqueous dispersion medium with a dispersing agent in a presence of a blowing agent;
    heating the dispersion at a temperature in a range of (a melting point of the polypropylene-based resin particles−25° C.) to (the melting point of the polypropylene-based resin particles+25° C.) under pressure; and
    releasing the dispersion into a low pressure region,
    wherein the polypropylene-based resin particles are used in an amount of 20 parts by weight to 100 parts by weight per 100 parts by weight of the aqueous dispersion medium,
    the polypropylene-based resin particles comprising a polypropylene-based resin composition including:
    a polypropylene-based resin;
    a sterically hindered amine ether flame retardant expressed by the following general formula (1):

$$R^1NHCH_2CH_2CH_2NR^2CH_2CH_2NR^3CH_2CH_2CH_2NHR^4 \quad (1)$$

(where $R^1$, $R^2$ and one of $R^3$ and $R^4$ are an s-triazine moiety T expressed by the following general formula (2):

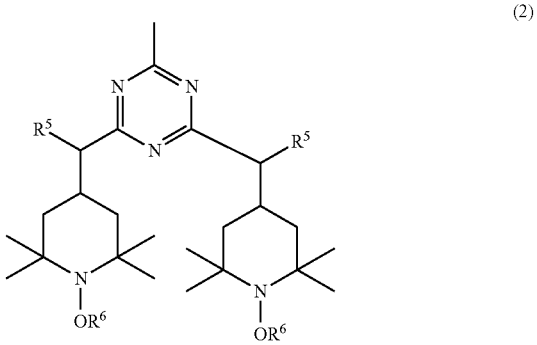

the other of $R^3$ and $R^4$ is a hydrogen atom, and in the general formula (2), $R^5$ is an alkyl group having 1 to 12 carbon atoms and $R^6$ is a methyl group, a cyclohexyl group, or an octyl group); and
    an aromatic phosphoric ester, wherein the aromatic phosphoric ester is a condensed phosphoric containing at least two phosphate sites of the aromatic phosphoric ester in a molecule, and has an alkyl group on a benzene ring of an aromatic hydrocarbon radical.

2. The method for producing polypropylene-based resin pre-expanded particles according to claim 1, wherein the blowing agent is at least one selected from the group consisting of isobutane and normal butane.

3. The method for producing polypropylene-based resin pre-expanded particles according to claim 1, wherein the blowing agent is carbon dioxide.

4. The method for producing polypropylene-based resin pre-expanded particles according to claim 1, wherein the polypropylene-based resin composition includes 0.05 parts by weight to 5 parts by weight of the sterically hindered amine ether flame retardant expressed by the general formula (1) and 0.01 parts by weight to 10 parts by weight of the aromatic phosphoric ester with respect to 100 parts by weight of the polypropylene-based resin.

5. The method for producing polypropylene-based resin pre-expanded particles according to claim 1, wherein the alkyl group is methyl group or isopropyl group.

* * * * *